United States Patent [19]

Taniguchi et al.

[11] Patent Number: 5,162,928
[45] Date of Patent: Nov. 10, 1992

[54] HEAD-UP DISPLAY APPARATUS

[75] Inventors: Naosato Taniguchi, Atsugi; Tetsuro Kuwayama, Yokohama; Nobou Kushibiki, Yamato; Yoko Yoshinaga, Machida, all of Japan

[73] Assignee: Canon Kabushiki Kaisha, Tokyo, Japan

[21] Appl. No.: 737,806

[22] Filed: Jul. 29, 1991

Related U.S. Application Data

[63] Continuation of Ser. No. 430,302, Nov. 2, 1989, abandoned.

[30] Foreign Application Priority Data

Nov. 2, 1988 [JP] Japan ............................ 63-277650

[51] Int. Cl.$^5$ .................. G02B 5/32; G02B 27/10; G02F 1/35
[52] U.S. Cl. ..................... 359/13; 359/328; 359/630
[58] Field of Search ........... 350/3.64, 3.7, 3.72; 307/425, 427; 372/21, 22; 359/13, 14, 326, 328, 630

[56] References Cited

U.S. PATENT DOCUMENTS

| | | |
|---|---|---|
| 3,634,614 | 4/1969 | Geusic et al. |
| 3,703,328 | 11/1972 | Glass et al. ............... 350/3.64 |
| 3,922,061 | 11/1975 | Glass et al. ............... 350/3.64 |
| 4,218,111 | 8/1980 | Withrington et al. |
| 4,407,564 | 10/1983 | Ellis ............................. 350/3.7 |
| 4,530,564 | 7/1985 | Close ........................... 350/3.72 |
| 4,592,618 | 6/1986 | Huignard et al. ......... 350/3.64 |
| 4,637,026 | 1/1987 | Liu ............................... 307/427 |
| 4,669,810 | 6/1987 | Wood .......................... 350/3.72 |
| 4,748,631 | 5/1988 | Bjorklund .................. 372/21 |
| 4,761,059 | 8/1988 | Yeh et al. ................... 350/3.64 |
| 4,763,990 | 8/1988 | Wood .......................... 350/3.72 |
| 4,768,846 | 9/1988 | Connors et al. ........... 350/3.64 |
| 4,826,269 | 5/1989 | Streifer et al. ............. 350/3.72 |
| 4,930,847 | 6/1990 | Cederquist ................. 350/3.72 |

FOREIGN PATENT DOCUMENTS 0007039 1/1980 European Pat. Off.
0299456 1/1989 European Pat. Off.

OTHER PUBLICATIONS

Japanese Patent Abstracts, vol. 13, No. 165, corresponding to Japanese Patent Document No. 64-2024, published Jan. 6, 1989.
Optical Engineering, "Infrared Imaging Using Non-linear Optical Upconversion", Krishnan et al., Mar.-Apr. 1978, pp. 108-113.
IEEE International Convention Digest "Upconversion: A New Technique for Infrared to Visible Conversion", A. Firester, 1970, pp. 22-23.

Primary Examiner—Martin Lerner
Attorney, Agent, or Firm—Fitzpatrick, Cella, Harper & Scinto

[57] ABSTRACT

A method of observing information includes the steps of converting a radiation beam into a visible harmonic beam conforming to the information and observing the information by the harmonic beam. An apparatus for observing information therethrough includes a source for producing a radiation beam conforming to the information, and a converter for converting the radiation beam into a visible harmonic beam, with the information being observed with the aid of the harmonic beam. In addition, a head-up display apparatus includes a source for producing a radiation beam conforming to information to be displayed, a converter for converting the radiation beam into a visible harmonic beam, and a beam combiner for receiving the harmonic beam and directing it in a predetermined direction to effect the display of the information by the harmonic beam.

26 Claims, 1 Drawing Sheet

HEAD-UP DISPLAY APPARATUS

BACKGROUND OF THE INVENTION

1. Field of the Invention

This invention relates to a head-up display apparatus, and particularly to a head-up display apparatus by which the observation of information is effected through a beam coupler having a hologram.

2. Related Background Art

A head-up display apparatus for observing thereby the display information from the display device and the landscape ahead in spatially superposed relationship within the same field of view by the use of an optically transparent light beam coupling element such as a half-mirror provided with a reflecting surface comprising a multilayer film or a hologram element comprising a volume type phase diffraction grating is well known.

Several applications of such head-up display apparatus to the cockpits of aircrafts and various vehicles have heretofore been proposed.

FIG. 1 of the accompanying drawings is a cross-sectional view showing the head-up display apparatus shown in U.S. Pat. No. 4,218,111. In FIG. 1, the reference numeral 61 designates a display element for producing a display pattern, the reference numeral 62 denotes the light emitting surface (the displaying surface) of the display element 61, the reference numeral 63 designates a relay lens installed forwardly of the light emitting surface 62, the reference numeral 64 denotes the real image of the light emitting surface 62 formed by the relay lens 63, the reference numeral 65 designates a turn-back prism inclinedly installed forwardly of the relay lens 63, the reference numeral 66 denotes a light beam combining element comprising a reflection type hologram, and the reference numeral 67 designates the observer's pupil.

The light emitted from the light emitting surface 62 has a narrow band width chiefly of a particular wavelength λ and the relay lens 63 forms the real image 64 of the light emitting surface 62 by this light, and the light from the real image 64 is reflected by the turn-back prism 65 and enters the reflection type hologram 66.

The reflection type hologram 66 is designed to reflect chiefly a light of narrow band width in the vicinity of the wavelength λ and transmit therethrough chiefly lights of wavelengths other than the narrow band width wavelength range, and forms the virtual image of the light emitting surface 62 on the pupil 67.

Accordingly, the observer can observe the information displayed on the light emitting surface 62 in superposed relationship with the landscape ahead, through the hologram 66, while seeing the landscape.

However, in the head-up display apparatus shown in FIG. 1, the display element 61 uses a CRT device having the interior of its tube kept in a vacuum which produces a light beam of narrow band width chiefly of the particular wavelength λ and therefore, if an attempt is made to contrive an enlarged area of the light emitting surface 62, the volume and weight of the entire display element will be remarkly increased and after all, this has led to the problem that the entire head-up display apparatus becomes bulky. Also, the luminance of the fluorescent substance of the light emitting surface 62 is limited, and when the landscape is bright, visibility is reduced. Also, the CRT device used in the apparatus of this kind to produce a light beam having the abovedescribed narrow band width is an expensive device and precludes a reduction in the cost of the head-up display apparatus.

SUMMARY OF THE INVENTION

The present invention has been made in view of the above-noted problems peculiar to the prior art and the object thereof is the provision of an improved observation method and an improved observation apparatus and the provision of an improved head-up display apparatus constructed with such method and apparatus applied thereto.

To achieve the above object, the present observation method has the steps of converting a radiation beam into a visible harmonic beam conforming to information, and observing said information by said harmonic beam. The present observation apparatus has means for producing a radiation beam conforming to information and means for converting said radiation beam into a visible harmonic beam, and is designed to observe said information by said harmonic beam.

In such a method and an apparatus, a laser beam can be used as the radiation beam. In a certain form of the method and apparatus, conversion of the laser beam into a harmonic beam is effected while the laser beam is scanned and while the intensity of the laser beam is modulated, whereby observation of the information is effected. In another form of the method and apparatus, observation of the information is effected by the use of the illumination of a plate on which a pattern conforming to the information is formed, by the laser beam, or a number of laser beams from a laser array.

Also, a well-known non-linear optical device can be used as the converting means, and in a certain form of the method and apparatus, use is made of a device which diffuses the radiation beam entering there. It is also possible both to reflect the radiation beam entering there by such a device and to transmit the radiation beam by such a device.

Accordingly, to achieve the above object, a certain form of the head-up display apparatus of the present invention has means for producing a radiation beam conforming to information to be displayed: means for converting said radiation beam into a visible harmonic beam, and a beam combiner for receiving said harmonic beam and directing it in a predetermined direction to effect the display of said information by said harmonic beam. Another form of the apparatus has a laser, a beam combiner having a hologram, means for directing the laser beam from said laser to said combiner, said means having a first device for converting said laser beam into a visible harmonic beam and a second device for scanning said laser beam, and means for modulating the intensity of said laser beam. Still another form of the apparatus has means for supplying a radiation beam, a beam combiner, a scanning optical system for directing the beam from said supplying means to said combiner while scanning said beam, and means for modulating the intensity of said beam in conformity with information to be displayed. Yet still another form of the apparatus has means for supplying visible laser radiation, means for modulating said laser radiation in conformity with information to be displayed, and a beam combiner having a volume type hologram for receiving said laser radiation modulated by said modulating means and diffracting it in a predetermined direction, and in this form of the apparatus, preferably, said supplying means is designed such that the band width of said laser radiation coincides with the half value width of said hologram, as will be described later.

Further, to achieve the above object, the present information observation method in the head-up display apparatus has the steps of converting a radiation beam into a visible harmonic beam conforming to information, directing said harmonic beam to a beam combiner, and observing said information by said harmonic beam through said combiner.

These head-up display apparatuses and the information observation method therein permit the application of all the aforedescribed forms of the observation apparatus and observation method thereto. Also, the beam combiner, in a certain form, may be a hologram, and preferably a volume type hologram of narrow half value width (i.e., of strong wavelength selecting property). In this case, the hologram is suitably designed such that the half value width of this hologram substantially coincides with the band width of the radiation beam and/or the harmonic beam. Other diffraction gratings than the diffraction grating of a form like a hologram can also be used, and a diffraction grating of any of the type which reflects the radiation beam and/or the harmonic beam entering there and the type which transmits the radiation beam and/or the harmonic beam entering there can be chosen.

Several features and specific forms of the present invention will become apparent from the following detailed description of some embodiments of the invention.

DESCRIPTION OF THE PREFERRED EMBODIMENTS

Figure 1:
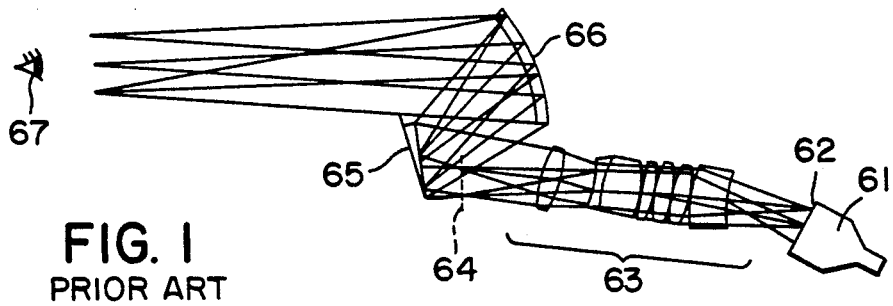
FIG. 1 is a longitudinal cross-sectional view showing an example of the head-up display apparatus according to the prior art.
Figure 2:
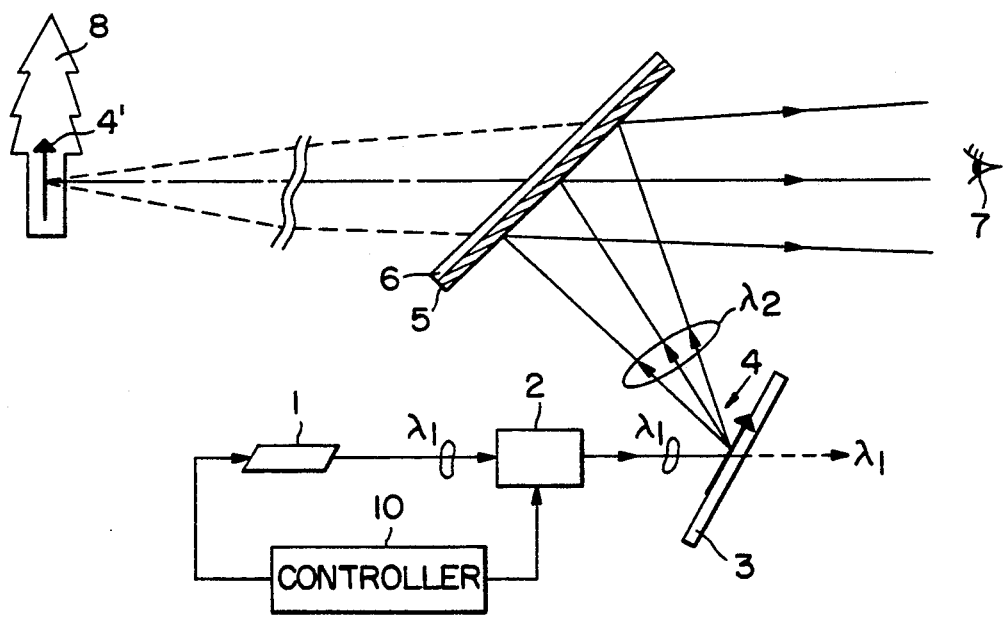
FIG. 2 is a schematic view showing an embodiment of the present invention.

Referring to FIG. 2 which is a schematic view showing an embodiment of the present invention, the reference numeral 1 designates a laser radiating a coherent laser beam of wavelength $\lambda_1$, the reference numeral 2 denotes a light deflector having a galvano mirror and scanning the laser beam entering it, and the reference numeral 3 designates a non-linear optical device which is a device producing high-order harmonic such as 2nd-order or 3rd-order harmonic. The device 3 converts the laser beam of wavelength $\lambda_1$ entering it into a visible harmonic beam of wavelength $\lambda_2$. Also, this device 3 is designed to reflect and diffuse the laser beam entering it, simultaneously with such wavelength conversion. The light deflector 2 is provided with a lens assembly in addition to the galvano mirror, and causes the beam reflected and deflected by the galvano mirror to be focused on the device 3 by the action of the lens assembly. Accordingly, a beam spot is formed on the device 3.

The reference numeral 5 denotes a light beam combining element comprising a volume type hologram (hereinafter referred to as the "hologram") for reflecting and diffracting the laser beam entering it. The element 5 is mounted on a transparent support 6 such as glass or plastic, whereby a beam combiner is constituted. The reference numeral 7 designates the observer's pupil.

In the present embodiment, the laser beam of wavelength $\lambda_1$ from the laser 1 is two-dimensionally scanned in the vertical direction in the plane of the drawing sheet and a direction orthogonal to said direction and the plane of the drawing sheet by the light deflector 2, and enters the non-linear optical device 3.

The non-linear optical device 3 converts the laser beam of wavelength $\lambda_1$ entering it into a light beam of wavelength $\lambda_2$. Accordingly, the laser beam (harmonic beam) wavelength-converted into the wavelength $\lambda_2$ and having become diffused light emerges from the non-linear optical device 3.

The laser 1 is a laser which can modulate the intensity of the laser beam emitted therefrom, and the intensity of the laser beam is modulated in conformity with an image signal indicative of predetermined information which is sent from a controller 10. On the other hand, the light deflector 2 deflects the laser beam in response to a synchronizing signal from the controller 10, and scans the non-linear optical device 3 by a beam spot. Thus, by the scanning of the laser beam by the light deflector 2 and the intensity modulation of this laser beam being synchronized with each other by the controller 10, an image indicative of predetermined information 4 is displayed on the non-linear optical device 3. Of course, the scanning system for the laser beam may be a suitable desired scanning system such as the well-known interlace scanning. Also, the intensity modulation of the laser beam may be effected by the use of a light modulator installed in the optical path of the laser beam. In the case of the system shown in FIG. 2, the modulator is installed between the laser 1 and the light deflector 2.

The reflected beam of wavelength $\lambda_2$ based on the display information 4 formed on the non-linear optical device 3 enters the hologram 5.

The hologram 5 has such an optical characteristic that the landscape 8 ahead and display information 4' formed by the scattered light beam of wavelength $\lambda_2$ are observed in spatially superposed relationship with each other. That is, the hologram 5 has the spectral characteristic of chiefly reflecting the light beam of wavelength $\lambda_2$ and chiefly transmitting therethrough the other light beams than the light beam of wavelength $\lambda_2$ at a high transmittance. In the present embodiment, the "half value width" which is a parameter indicative of the wavelength selecting property of the diffraction efficiency of the hologram 5 is set so as to be several nm to several tens of nm, and is designed to coincide with the spectral characteristic of the non-linear optical device 3 as much as possible.

To prevent color blot from occurring on the display information 4', it is preferable that the half value width of the hologram 5 be narrow, with the wavelength dispersion characteristic (the characteristic that the angle of diffraction differs depending on the wavelength of the incident light) of the hologram 5 being taken into account.

However, it is difficult to control the half value width of the hologram 5 well. In contrast, in the present embodiment, the feature that the wavelength band (band width) of the laser beam of wavelength $\lambda_2$ obtained in the wavelength conversion by the non-linear optical device 3 is sufficiently narrow is utilized so that good observation in which the color blot of the display information 4' by the wavelength dispersion of the hologram 5 is corrected can be accomplished.

By the construction as described above, in the present embodiment, it is made possible to superpose the aerial image 4' of the display information 4 which is free of color blot on the landscape 8 in the air far from the hologram 5 by a predetermined distance, and observe both the aerial image 4' and the landscape 8 at a time in the same field of view by the pupil 7 through the hologram 5.

In the present embodiment, a volume type hologram is used as the light beam combining device 3, but other type diffraction grating or a half-mirror provided with a reflecting surface comprising a multilayer film is also applicable.

The non-linear optical device 3 in the present embodiment is formed of a material which is capable of producing high-order harmonic (beam) and in which the wavelength $\lambda_2$ of said harmonic is within the visible light range, for example, single crystal of an inorganic or organic compound, crystal powder, or powder particles of inorganic crystal or organic crystal dispersed into a high molecular compound or the like and made into a mixed system.

Also, powder particles obtained from the crystal of a non-linear optical compound changes the intensity of a high-order harmonic beam in conformity with the particle diameter thereof (that is, the efficiency of wavelength conversion depends on the particle diameter) and therefore, by selecting such a particle diameter that diffusing can be accomplished sufficiently and the intensity of the harmonic becomes great, the displaying performance (display luminance) can be improved.

Particularly, where use is made of a material in which phase adjustment cannot be made, it is desirable to select a particle diameter for which the intensity of the harmonic assumes a peak. Also, when such a material is used for the device 3, it is possible to discretely provide and use an element for effecting phase adjustment.

Figure 3:
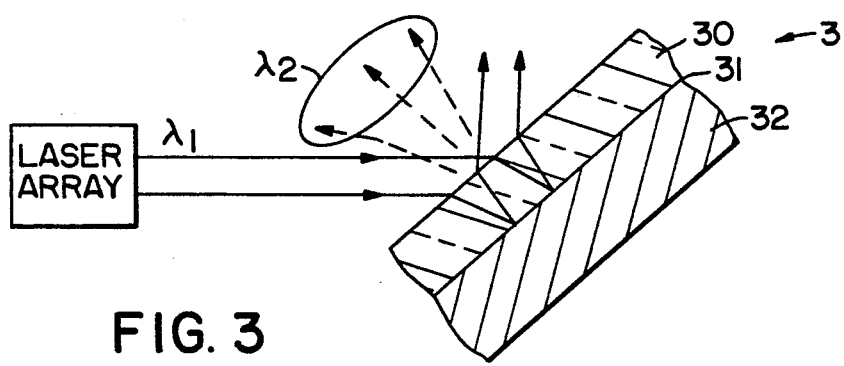
FIG. 3 is a cross-sectional view showing another example of the non-linear optical device.

FIG. 3 is a cross-sectional view showing another embodiment of the non-linear optical device. A light beam of wavelength $\lambda_1$ from a laser source such as, for example, a laser array 11, enters the non-linear optical device 3. A non-linear optical element 30 is disposed on an aluminum member 32 having its surface finished as a mirror surface (or a glass plate or a plastic plate having a surface reflection film). The light beam of wavelength $\lambda_1$ is transmitted through the non-linear optical element 30, whereafter it is reflected by a reflecting surface 31, and is again transmitted through the non-linear optical device 3.

By making such a design which satisfies the phase condition as a whole, with the reflectance of the reflecting surface 31 and the phase variation caused by the reflection being taken into consideration, as compared with the device of FIG. 2, the quantity of the light of wavelength $\lambda_2$ can be increased to at least twice, as the conversion rate from the light of wavelength $\lambda_1$ into the light of wavelength $\lambda_2$, and to maximum three to four times when the effect of the light of wavelength $\lambda_2$ being reflected by the reflecting surface 31 is considered, and the effect thereof is very great. Accordingly, brighter display of information can be accomplished by applying such a device 3 to the apparatus of FIG. 2.

As the reflection type hologram in each of the above-described embodiments, use is made of a grating pattern of the volume phase type recorded on a photosensitive material consisting chiefly of bichromate gelatine or polyvinyl carbazole.

A neodymium glass laser, a solid laser, a dye laser, a semiconductor laser or the like is applicable as the laser 1 which supplies a radiation beam as a carrier of display information in each of the above-described embodiments. Particularly, a semiconductor laser is most effective for making the apparatus compact and low in cost.

On the other hand, where a second harmonic generating element (SHG element) is used as the device 3 to display information, a laser oscillating a wavelength of 0.8 $\mu$m–1.5 $\mu$m is preferable, and for example, an Nd-YAG laser ($\lambda_1 = 1.064$ $\mu$m), a dye laser ($\lambda_1 = (850-950$ nm)), a semiconductor laser (AlGaAs; $\lambda_1 = 0.7-1$ $\mu$m, InGaAsP; $\lambda_1 = 1-1.6$ $\mu$m) or the like is preferable.

Also, where a third harmonic generating element (THG element) is used as the device 3 to form display information, a laser oscillating a wavelength of 1.2 $\mu$m–2.3 $\mu$m is preferable.

Also, where as the light deflector 2, use is made of a deflector of the light waveguide type, instead of the mechanical type such as the galvano mirror in the above-described embodiments or a polygon mirror, it is preferable that the light waveguide be formed by the use of a material of small light absorption. For example, a waveguide in which titanium diffusion has been effected on the surface of niobic acid lithium crystal is great in absorption for the visible range and is sometimes difficult to use, but for the infrared range as described above, there is no such problem and in combination with a surface elastic wave, deflection of high light utilization efficiency can be accomplished.

As the laser used in the head-up display apparatus, an Nd-YAG laser the wavelength of whose secondary harmonic is 532 nm is preferable in that it substantially agrees with visibility.

Also, in each of the above-described embodiments, there has been shown a case where the laser beam is intensity-modulated and scanned to thereby form the display information 4, but it is also possible to effect the direct modulation of the laser beam of each laser by the use of a surface light emitting semiconductor laser array comprising two-dimensionally arranged lasers, or to produce a pattern light of wavelength $\lambda_1$ corresponding to the display image by applying a laser beam to a plate formed with the pattern of the display image, and thereafter cause the pattern light to enter the non-linear optical device, and particularly, where the surface light emitting semiconductor laser array is used, there is the advantage that the non-linear optical device is formed on and made integral with the window glass or the of the surface light emitting semiconductor laser, whereby further compactness and lighter weight of the entire apparatus can be achieved.

Also, a reflection type hologram is used in each of the above-described embodiments, but the use of a transmission type hologram can also achieve the object of the present invention.

The advantages of the apparatus of each of the above-described embodiments may be summed up as followed.

Firstly, even if the display screen (the light emitting screen) is made large, the great weight of the entire display apparatus can be avoided. In the conventional CRT, if the light emitting screen is made large, the volume of the tube kept in a vacuum is also increased, and this leads to the bulkiness and heavy weight of the entire apparatus. In contrast, in the embodiment shown in FIG. 2, the deflected light travels not through a vacuum, but through the air and therefore, even if the light emitting screen is made large, the weight will not be so much increased.

Also, the space in which the light from the laser is deflected and passes to the light emitting screen is used also as an optical path along which the light beam from the light emitting screen passes to the light beam combining element and therefore, it becomes possible to make the optical path of the display apparatus which originally requires a great volume compact.

Also, a laser beam which is a coherent light outside the visible range is applied to the non-linear optical device and wavelength conversion is effected by the generation of a harmonic beam within the visible range (for example, the second harmonic, the third harmonic or the like) and simultaneously therewith, the visualized harmonic beam is diffused, whereby good display of information within a narrow light emission wavelength range is accomplished.

Also, a volume phase type hologram is used as the light beam combining element and the half value width which is a parameter indicative of the wavelength selecting characteristic (the dependency of the diffraction efficiency on wavelength) of said hologram is rendered into a relatively narrow value of several nm to several tens of nm, and the wavelength range of the harmonic beam is made substantially coincident with the half value width of the hologram, whereby clear-cut display of high contrast free of color blot is made possible.

Also, even if a hologram is used as the light beam combining element, there can be provided a head-up display apparatus in which the display information and the landscape adhead are spatially superposed one upon the other through the light beam combining element and the display information can be observed in the same field of view and moreover without color blot and at high contrast.

We claim:

1. A head-up display apparatus for displaying an image to a viewer, comprising:
   a laser emitting an infrared beam;
   means for producing a beam indicative of the image from the infrared beam;
   a beam combiner; and
   a non-linear optical element for converting the beam indicative of the image into a visible diffusion-harmonic beam and for directing the diffusion-harmonic beam to the viewer through said beam combiner, wherein
   a visible image formed on said non-linear optical element and a landscape are combined by said beam combiner.

2. A head-up display according to claim 1, wherein said optical member reflectively diffuses said beam indicative of the image.

3. A head-up display according to claim 2, wherein said optical member converts the infrared beam into a secondary harmonic.

4. A head-up display according to claim 3, wherein said beam combiner comprises a hologram for reflectively diffracting the diffusion-harmonic beam.

5. A head-up display according to claim 2, wherein said optical member converts the infrared beam into a third harmonic.

6. A head-up display according to claim 5, wherein said beam combiner comprises a hologram for reflectively diffracting the diffusion-harmonic beam.

7. A head-up display according to claim 1, wherein said producing means includes means for modulating the intensity of the infrared beam in conformity with information indicative of the image.

8. A head-up display according to claim 7, wherein said laser comprises a laser array having a plurality of semiconductor lasers, and wherein the beam indicative of the image is produced from a plurality of beams from said laser array.

9. A head-up display according to claim 8, wherein said optical member converts the infrared beam into a secondary harmonic.

10. A head-up display according to claim 9, wherein said beam combiner comprises a hologram for reflectively diffracting the diffusion-harmonic beam.

11. A head-up display according to claim 8, wherein said optical member converts the infrared beam into a third harmonic.

12. A head-up display according to claim 11, wherein said beam combiner comprises a hologram for reflectively diffracting the diffusion-harmonic beam.

13. A head-up display according to claim 7, wherein said producing means has means for condensing said infrared beam onto said optical member and for two-dimensionally scanning it thereon, so that the beam indicative of the image is produced by effecting the scanning by said condensing means in synchronization with the modulation by said modulating means.

14. A head-up display according to claim 13, wherein said optical member converts the infrared beam into a secondary harmonic.

15. A head-up display according to claim 14, wherein said beam combiner comprises a hologram for reflectively diffracting the diffusion-harmonic beam.

16. A head-up display according to claim 13, wherein said optical member converts the infrared beam into a third harmonic.

17. A head-up display according to claim 16, wherein said beam combiner comprises a hologram for reflectively diffracting the diffusion-harmonic beam.

18. A method for displaying an image to a viewer through a beam combiner, said method comprising the step of:
   generating a visible diffusion-harmonic beam indicative of the image by diffusing an infrared beam with a non-linear optical element;
   making the diffusion-harmonic beam incident on the pupil of the viewer through the beam combiner; and
   combining a visible image formed on the non-linear optical element and a landscape by the beam combiner.

19. A method according to claim 18, wherein the beam combiner comprises a volume type hologram.

20. A method according to claim 19, wherein the beam combiner reflectively diffracts the diffusion-harmonic beam.

21. A head-up display apparatus for displaying an image to a viewer, said apparatus comprising:
   a beam combiner having a volume type hologram through which the image is displayed;
   a semiconductor laser emitting an infrared beam;
   a non-linear optical element provided between said semiconductor laser and said hologram;
   a scanner, provided between said semiconductor laser and said non-linear optical element, for scanning said non-linear optical element with the infrared beam; and a controller for projecting the image on said non-linear optical element by modulating the intensity of the infrared beam to be scanned in accordance with a video signal and for directing a visible diffusion-harmonic beam corresponding to the image from said non-linear optical element toward said hologram, wherein a visible image formed on said non-linear optical element and a landscape are combined by said beam combiner.

22. A head-up display apparatus according to claim 21, wherein said hologram causes said visible diffusion-harmonic beam to be reflectively diffracted and to be incident on the pupil of the viewer.

23. A head-up display apparatus according to claim 22, wherein said non-linear device reflectively diffuses said infrared beam to be directed to said hologram.

24. A head-up display apparatus for displaying an image to a viewer, said apparatus comprising:

a beam combiner having a volume type hologram through which the image is displayed;

a non-linear optical element; and a laser array for projecting the image on said non-linear optical element with a plurality of infrared beams and for directing a visible diffusion-harmonic beam corresponding to the image from said non-linear optical element toward said volume type hologram, wherein a visible image formed on said non-linear optical element and a landscape are combined by said beam combiner.

25. A head-up display apparatus according to claim 24, wherein said hologram causes said visible diffusion-harmonic beam to be reflectively diffracted and to be incident on the pupil of the viewer.

26. A head-up display apparatus according to claim 25, wherein said non-linear device reflectively diffuses said infrared beams to be directed to said hologram.

* * * * *

UNITED STATES PATENT AND TRADEMARK OFFICE
CERTIFICATE OF CORRECTION

PATENT NO. : 5,162,928

DATED : November 10, 1992

INVENTOR(S) : Naosato Taniguchi, et al.

It is certified that error appears in the above-identified patent and that said Letters Patent is hereby corrected as shown below:

TITLE PAGE
[75] INVENTORS:

"Nobou Kushibiki" should read as --Nobuo Kushibiki--.

COLUMN 4:

Line 29, "suitable" should read --suitably--.

COLUMN 6:

Line 51, "the of" should be deleted.

Signed and Sealed this

Twenty-third Day of November, 1993

Attest:

BRUCE LEHMAN

Attesting Officer

Commissioner of Patents and Trademarks